United States Patent
Philipp

(10) Patent No.: US 10,427,887 B2
(45) Date of Patent: Oct. 1, 2019

(54) BELT BUFFER

(71) Applicant: ROTZINGER AG, Kaiseraugst (CH)

(72) Inventor: Kurt Philipp, Grenzach-Wyhlen (DE)

(73) Assignee: ROTZINGER AG, Kaiseraugst (CH)

( * ) Notice: Subject to any disclaimer, the term of this patent is extended or adjusted under 35 U.S.C. 154(b) by 0 days.

(21) Appl. No.: 15/774,431

(22) PCT Filed: Oct. 25, 2016

(86) PCT No.: PCT/EP2016/075634
§ 371 (c)(1),
(2) Date: May 8, 2018

(87) PCT Pub. No.: WO2017/080812
PCT Pub. Date: May 18, 2017

(65) Prior Publication Data
US 2018/0305137 A1   Oct. 25, 2018

(30) Foreign Application Priority Data
Nov. 11, 2015 (CH) ..................... 1638/15

(51) Int. Cl.
| | |
|---|---|
| *B65G 1/02* | (2006.01) |
| *B65G 47/68* | (2006.01) |
| *B65G 47/64* | (2006.01) |
| *B65G 47/51* | (2006.01) |
| *B65G 47/71* | (2006.01) |

(52) U.S. Cl.
CPC ........... *B65G 47/5131* (2013.01); *B65G 1/02* (2013.01); *B65G 47/5109* (2013.01); *B65G 47/647* (2013.01); *B65G 47/68* (2013.01); *B65G 47/681* (2013.01); *B65G 47/71* (2013.01)

(58) Field of Classification Search
CPC ...... B65G 47/5109; B65G 1/02; B65G 47/57; B65G 47/647; B65G 1/00; B65G 47/68
USPC ............ 198/347.1, 347.3, 347.4, 435
See application file for complete search history.

(56) References Cited

U.S. PATENT DOCUMENTS

| | | | | |
|---|---|---|---|---|
| 3,080,043 A | * | 3/1963 | Johansen | B65H 29/18 198/435 |
| 3,358,831 A | * | 12/1967 | Cothrell | B27L 5/002 198/347.4 |
| 4,284,187 A | * | 8/1981 | Kramer | B65G 47/5186 198/435 |
| 4,541,824 A | * | 9/1985 | Muller | B65H 5/28 198/371.2 |

(Continued)

FOREIGN PATENT DOCUMENTS

| | | |
|---|---|---|
| EP | 1 666 390 A1 | 6/2006 |
| JP | 2-66020 A | 3/1990 |

(Continued)

OTHER PUBLICATIONS

International Search Report dated Jan. 31, 2017, in PCT/EP2016/075634 filed Oct. 25, 2016.

*Primary Examiner* — James R Bidwell
(74) *Attorney, Agent, or Firm* — Oblon, McClelland, Maier & Neustadt, L.L.P.

(57) ABSTRACT

In a belt buffer including a plurality of buffer belts arranged one above the other, receiving edges of the buffer belts at entry and delivery edges of the buffer belts at an exit of the belt buffer are height-adjustable. The buffer belts can include a plurality of belt modules arranged one after the other.

8 Claims, 2 Drawing Sheets

(56) References Cited

U.S. PATENT DOCUMENTS

Figure 1:
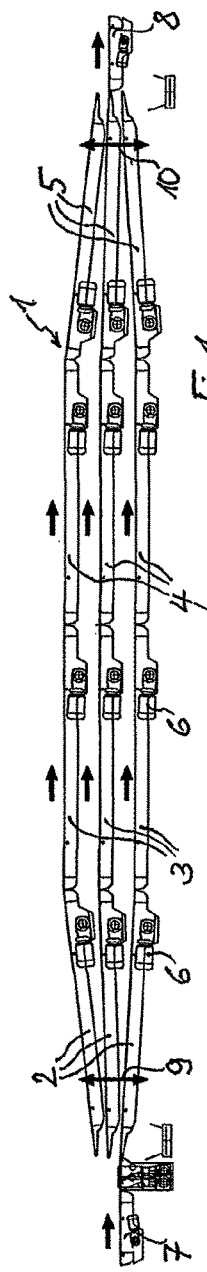

| | | | | |
|---|---|---|---|---|
| 5,430,994 A | * | 7/1995 | Focke | B65B 35/04 |
| | | | | 198/347.4 |
| 6,105,751 A | * | 8/2000 | Jentjens | B65G 47/715 |
| | | | | 198/435 |
| 6,260,688 B1 | * | 7/2001 | Steeber | B65G 21/18 |
| | | | | 198/347.4 |
| 2011/0259711 A1 | | 10/2011 | Broers et al. | |
| 2016/0031655 A1 | | 2/2016 | Broers et al. | |

FOREIGN PATENT DOCUMENTS

| | | |
|---|---|---|
| JP | 11-89521 A | 4/1999 |
| WO | WO 99/37564 A1 | 7/1999 |
| WO | WO 2010/043692 A1 | 4/2010 |

* cited by examiner

BELT BUFFER

BACKGROUND

For the purpose of this description, the term belt buffer is understood to mean additional conveyor belts which are inserted in a conveyor line between an entry and an exit conveyor belt to enable an intermediate storage of conveyed products or to specifically extend the conveyor line.

Such belt buffers are used, for example, in the conveying of unpackaged products when it is necessary to provide intermediate storage between the production and the packaging of the products in the event of faults in the packaging area so that no overflow or wastage can occur. This considerably increases the efficiency of production lines. These belt buffers are usually designed on the "first-in/first-out" (FIFO) principle.

Furthermore, with an extension of the conveyor line between production and packaging, the products can also be cooled before they can be packed. As well as the flexible buffering of faults, a belt buffer can therefore also fulfill a cooling function. This is often the case in biscuit production, as the freshly produced products, directly from the oven, are still hot and must be carefully cooled before they can be packed.

In addition, it can be a requirement for the oven to be also able to be run until it is empty in the event of an extended fault in the packaging area, particularly in the case of very valuable complex products which can no longer be fed to a re-work area. In such a case, the buffer section must be designed such that, in all cases, the full length of the oven can be run into the belt buffer.

In these belt buffers, the incoming rows of product are accepted in a synchronized manner in the entry to the belt buffer and indexed without tailback pressure to form formations or product groups. These formations are then transported towards the exit of the belt buffer at higher speed in order to be then fed without tailback pressure and without gaps to the packaging machines.

The entry section of the belt buffer is responsible for the incoming rows of product to be inspected for length and height and distance apart so that only acceptable products pass to the packaging machines. This is usually detected using optical sensors. Non-acceptable rows of product are channeled out in order to prevent subsequent faults.

The requirements for the entry section further consist in the building of product formations without tailback pressure. These product formations are normally made with one or more short belts. The number and length of these belts depends on the type, consistency and dimensions of the product and on the infeed speed.

The formations consist of a defined number of rows of product, which are indexed with regular spacing. The formations are run on belts, the length of which corresponds to the length of the product formation.

The belt buffer consists of any number of buffer belts having the length of a formation or an integral multiple of the formation length, arranged one after the other.

In order to adapt to an available space with limited installation length, a plurality of levels of buffer belts are usually arranged one above the other. The buffer effect is achieved in that the product formations are run towards the exit at higher speed. The formations are then indexed in the exit section of the buffer depending on the packaging speed. Typically, the overall packaging capacity is designed to be 15% to 20% faster than the production capacity. This enables the contents of the buffer to be emptied during production. The formations are usually indexed in rows once more at the exit to the belt buffer. This row separation depends on the number of packaging machines, their speed and the type of packaging.

In the prior art, the products are fed to the different levels at the entry of the belt buffer by means of a deflector in the form of a height-adjustable belt. In the same way, discharge from the different levels at the exit of the belt buffer is carried out with a deflector.

SUMMARY OF THE INVENTION

The invention is based on the object of further improving the efficiency and capacity of belt buffers having belts on a plurality of levels.

DETAILED DESCRIPTION OF THE DRAWINGS

Figure 2:
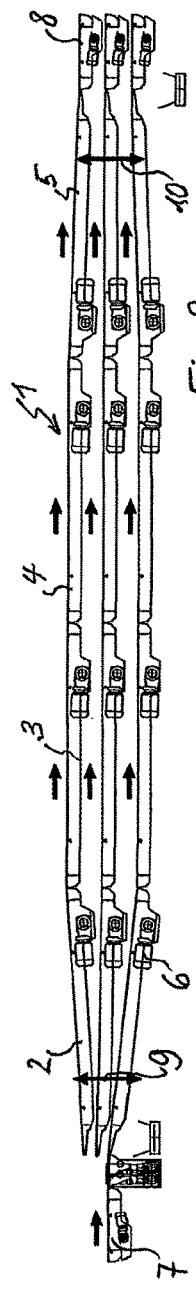
Figure 3:
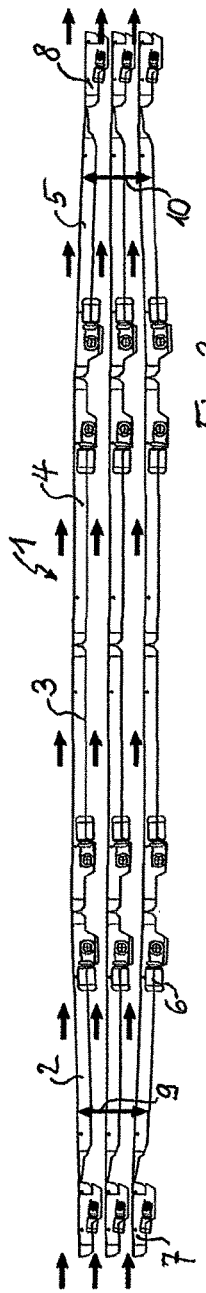
Figure 4:
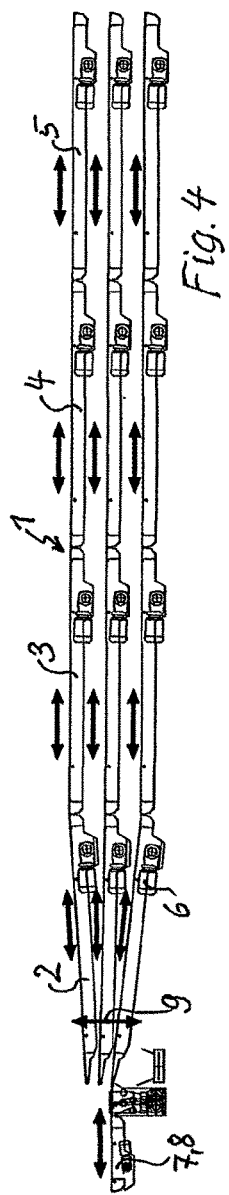
Figure 5:
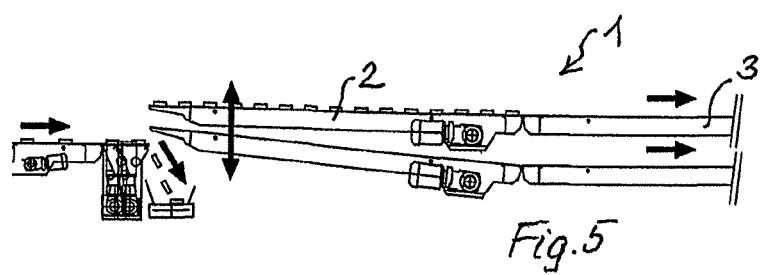
Figure 6:
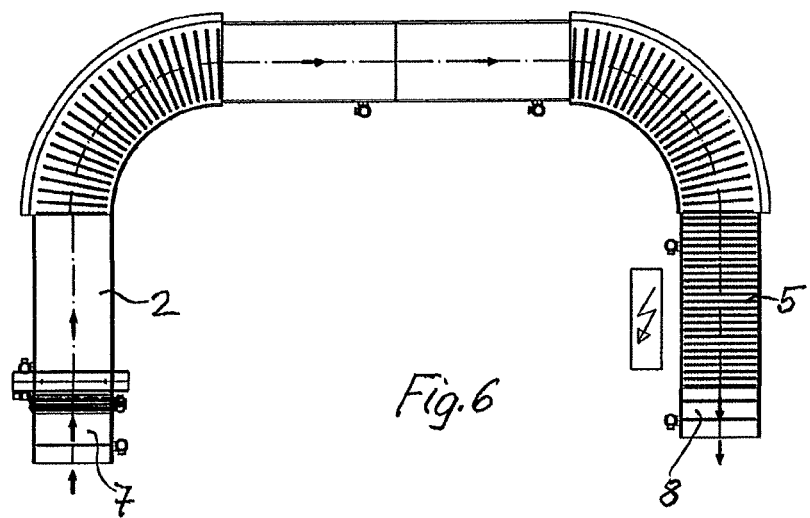

Preferred exemplary embodiments of the invention are described below with reference to the attached drawings. In the drawings FIG. 1 shows a belt buffer having three levels between an entry and exit belt, FIG. 2 shows a belt buffer having three levels and three exit belts, FIG. 3 shows a belt buffer having three levels, three entry and three exit belts, FIG. 4 shows a belt buffer with reversible belt direction for the "first-in/last-out" method (FILO), FIG. 5 shows the channeling-out of rejects, FIG. 6 shows a plan view of an alternative embodiment.

PREFERRED EMBODIMENTS

The belt buffer 1 shown in FIG. 1 consists of three levels of belt sections arranged one above the other which, for their part, consist of a plurality of belts 2, 3, 4, 5 arranged one after the other. The system is a modular system in which the individual belts have a length which corresponds to the multiple of a product formation. The individual belts are driven individually by means of servo motors 6.

As a basic principle, a different number of levels, for example two, four or more, is also possible instead of three levels.

The belt buffer 1 is inserted between a belt 7 coming from production and a belt 8 going to a packaging system. The receiving edges of the entry-side belts 2, which transfer the products from the entry belt 7, are height-adjustable as shown by the arrow 9. In this way, it is possible to bring the products directly, i.e. without interposing a deflector, onto the entry-side belts 2 of the belt buffer. In the position of the belts 2 shown, the incoming products are loaded onto the bottom level of the belt buffer.

There is a corresponding situation on the exit side: the delivery edges of the belts 5, which transfer the products to the exit belt, are likewise height-adjustable as shown by the arrow 10. In the position shown, the products are discharged for packaging from the middle level.

An advantage of the direct delivery without deflectors consists in that the height-adjustable belts are actively used as buffer belts so that a higher capacity can be achieved with the same length of belt buffer or, conversely, a required capacity can be achieved with a smaller installation length.

A further advantage consists in that there is a cost saving due to the omission of deflectors.

The ability to adjust the height of the entry-side and exit-side belts 2, 5 enable several requirements to be covered without additional length and belt equipment, for example the classic merging of the plurality of buffer levels to one conveyor level in the direction of the packaging area.

A further requirement can be fulfilled with the embodiment having a plurality of exit belts shown in FIG. 2. In this embodiment, a plurality of conveyor levels can be loaded with product. In addition, these levels can also be operated at different speeds.

In FIGS. 2-6, only the upper belt of identical belts of the modular system is shown with references.

In the entry section of the belt buffer, as shown in FIG. 3, it is also possible to process a plurality of levels lying one above the other with incoming rows of product without any problems, namely as a consequence of the ability to adjust the height of the entry and exit-side belts in many different combinations.

As shown in FIG. 4, the belt buffer can also be operated using the "first-in/last-out" principle. For this purpose, the buffer belts are driven reversibly, as shown by the double arrow, and the entry and the exit of the belt buffer lie on the same side.

In addition, an often required reject function, shown in FIG. 5, can be incorporated. If faulty products are detected at the product entry, the belts 2 are raised and the faulty products are simply channeled out.

The modular construction of this belt buffer enables widely differing layout requirements to be covered. As well as the classic in-line arrangement, it is also possible to cover very different space requirements by the use of curved belts as shown in FIG. 6. Here, it must be ensured that the development of the curved belts is sized such that one or more complete product formations can be placed thereon.

Instead of the modular system described in the exemplary embodiments, a simple embodiment, in which only one belt with height-adjustable receiving and delivery edges is provided on each level, is also possible.

The control of the proposed belt buffer is implemented in a control cabinet, which is preferably arranged in the vicinity of the belt buffer. The drive equipment for the buffer belts and the drives for the height adjustment of the buffer belts are executed by means of servo motors. This enables product handling and conveyor capacity to be set up optimally. The output capacity of the belt buffer is based on the degree to which it is filled. That is to say, the greater the degree to which it is filled, the faster the packing machines are supplied with product. In this way, imminent overfilling of the buffer is counteracted in good time and overflow and losses are prevented. This enables the line efficiency to be drastically increased.

The invention claimed is:

1. A belt buffer for intermediate storage of conveyed products comprising:
    a plurality of buffer belts arranged in levels one above the other,
    each buffer belt having a product entry side and a product exit side and consisting of a plurality of serially arranged belt modules comprising
    a single tiltable entry belt module having a height-adjustable receiving edge at the product entry side and a delivery edge being level with subsequent belt modules,
    a single tiltable exit belt module having a receiving edge being level with preceding belt modules and a height-adjustable delivery edge at the product exit side, and
    wherein the plurality of serially arranged belt modules are horizontally arranged between the single tiltable entry belt module and the single tiltable exit belt module.

2. The belt buffer according to claim 1, wherein the height-adjustable belts at the entry or exit can be raised for rows of product to be channeled out.

3. The belt buffer according to claim 1, wherein a plurality of entry or exit belt levels, which can be approached by the height-adjustable buffer belts, are provided on the entry or exit side.

4. The belt buffer according to claim 1, wherein the height adjustment of the individual entry-side or exit-side buffer belts takes place independently.

5. The belt buffer according to claim 1, wherein length of a buffer belt corresponds to length of a formation.

6. The belt buffer according to claim 1, wherein length of the buffer belts corresponds to an integral multiple of a product formation.

7. The belt buffer according to claim 1, wherein the buffer belts arranged one above the other are curved belts.

8. The belt buffer according to claim 1, wherein a running direction of the buffer belts is reversible.

* * * * *